United States Patent [19]
Rothgery et al.

[11] Patent Number: 5,703,323
[45] Date of Patent: Dec. 30, 1997

[54] PYRIDINE AND PYRIDONE STABILIZERS FOR HYDROXYLAMMONIUM NITRATE AND HYDROXYLAMINE-CONTAINING COMPOSITIONS

[75] Inventors: Eugene F. Rothgery, North Branford; Carl G. Seefried, Jr., Southbury, both of Conn.

[73] Assignee: Olin Corporation, Cheshire, Conn.

[21] Appl. No.: 713,686

[22] Filed: Sep. 17, 1996

[51] Int. Cl.$^6$ .................... C01B 21/20; C06B 25/00; C06B 25/34; C06B 31/00
[52] U.S. Cl. .................... 149/88; 149/45; 149/92; 423/265; 423/387
[58] Field of Search .................... 423/387, 265; 149/45, 46, 88, 92

[56] References Cited

U.S. PATENT DOCUMENTS

| | | |
|---|---|---|
| 3,145,082 | 8/1964 | Rausch et al. . |
| 3,544,270 | 12/1970 | Carlos . |
| 4,629,613 | 12/1986 | Grosskinsky et al. ............... 423/387 |
| 4,634,584 | 1/1987 | Grosskinsky et al. . |
| 5,318,762 | 6/1994 | Cawlfield et al. . |
| 5,510,097 | 4/1996 | Cawlfield et al. . |

FOREIGN PATENT DOCUMENTS

| | | | |
|---|---|---|---|
| 69841 | 4/1983 | Japan | ................... 423/387 |
| 69842 | 4/1983 | Japan | ................... 423/387 |
| 69844 | 4/1983 | Japan | ................... 423/387 |

OTHER PUBLICATIONS

George J. Kontoghiorghes "Iron Mobilisation From Lactoferrin by Chelators at Physiological pH". BBA Report; appearing in Biochimica et Biophysica Acta 882 (1986) at pp. 267–270. Dept.of Haematology, Royal Free Hospital School of Medicine, Pond Street, Hampstead, London NW3, 2QG (UK).

Mostert et al. "Free Radical and Cytotoxic Effects of Chelators and Their Iron Complexes in the Hepatocyte" appearing in Free Rad.Res.Commun. vol. 3, No. 6 at pp. 379–388 (1987 Harwood Academic Publishers GmbH, UK).

Hansen, Backof & de Greiff (Abstract) "Process for Assessing the Stability of HAN–Based Liquid Propellants" appearing in Fraunhofer–Institut for Chemische Technologie (1989).

*Primary Examiner*—Wayne Langel
*Attorney, Agent, or Firm*—Dale Lynn Carlson; Wiggin & Dana

[57] ABSTRACT

Disclosed is a stabilized hydroxylammonium nitrate or hydroxylamine-containing composition comprising said hydroxylammonium nitrate or hydroxylamine and a pyridine or pyridone salt, or an acid thereof, said pyridine or pyridone salt, or acid thereof, being present in said composition in an amount of between about 0.0001% and about 2%, based upon the weight of said composition. Also disclosed is a process for preparing this composition.

10 Claims, 2 Drawing Sheets

PYRIDINE AND PYRIDONE STABILIZERS FOR HYDROXYLAMMONIUM NITRATE AND HYDROXYLAMINE-CONTAINING COMPOSITIONS

The U.S. Government has rights in this invention Pursuant to Contract No. DAAA15-90-C-1061 awarded by the Department of Army. Under this contract, the U.S. Government has certain rights to practice or have practiced on its behalf the invention claimed herein without payment of royalties.

FIELD OF THE INVENTION

This invention relates generally to hydroxylammonium nitrate (also known as "HAN") and its precursor hydroxylamine, and more specifically, to stabilizing additives for hydroxylamine and HAN, as well as stabilizing additives for compositions containing HAN or hydroxylamine, most notably propellants such as liquid propellants (also called "LP") containing HAN and a fuel.

BACKGROUND OF THE INVENTION

HAN and hydroxylamine are known to be useful as oxidizers in propellant formulations for guns, rockets, satellites, and the like. Certain stabilizers for the hydroxylamine and HAN are also known. The stabilizers protect the HAN and hydroxylamine, in solutions or propellant formulations, against unwanted degradation during storage prior to use. By way of illustration, chelating agents such as the tetrasodium salt of ethylenediaminetetraacetic acid ("EDTA") are disclosed as stabilizers for hydroxylamine in U.S. Pat. No. 3,145,082. As another illustration, aminophosphonic acids are disclosed as stabilizers for HAN-based LP compositions in a technical journal article entitled "Process for Assessing the Stability of HAN-based Liquid Propellants" by Dr. R. Hansen, Dr. E. Backof and Dr. H. J. deGreiff, published by the European Research Office of the U.S. Army (London, England; February, 1989).

There is a continuing need for cost-effective stabilizers for HAN- and hydroxylamine-containing compositions that exhibit enhanced stabilizing efficacy relative to prior art stabilizers for these compositions. The present invention provides an answer to this need.

SUMMARY OF THE INVENTION

In one aspect, the present invention relates to a stabilized hydroxylammonium nitrate or hydroxylamine-containing composition comprising said hydroxylammonium nitrate or hydroxylamine and a pyridine or pyridone salt, or an acid thereof, said pyridine or pyridone salt, or acid thereof, being present in said composition in an amount of between about 0.0001% and about 2%, based upon the weight of said composition.

In another aspect, the present invention relates to a process for stabilizing hydroxylammonium nitrate or hydroxylamine against unwanted degradation during storage prior to use which comprises contacting said hydroxylammonium nitrate or hydroxylamine with a stabilizing-effective amount of a pyridine or pyridone salt to provide a storage stable composition.

In another aspect, the present invention relates to a process for forming a storage-stable composition of hydroxylammonium nitrate or hydroxylamine, or propellant formulations containing at least one of these compounds, which comprises mixing a stabilizing-effective amount of a pyridine or pyridone salt with a composition comprising hydroxylammonium nitrate or hydroxylamine to provide said storage-stable composition.

These and other aspects will become apparent upon reading the following detailed description of the invention.

DETAILED DESCRIPTION OF THE INVENTION

Figure 1:
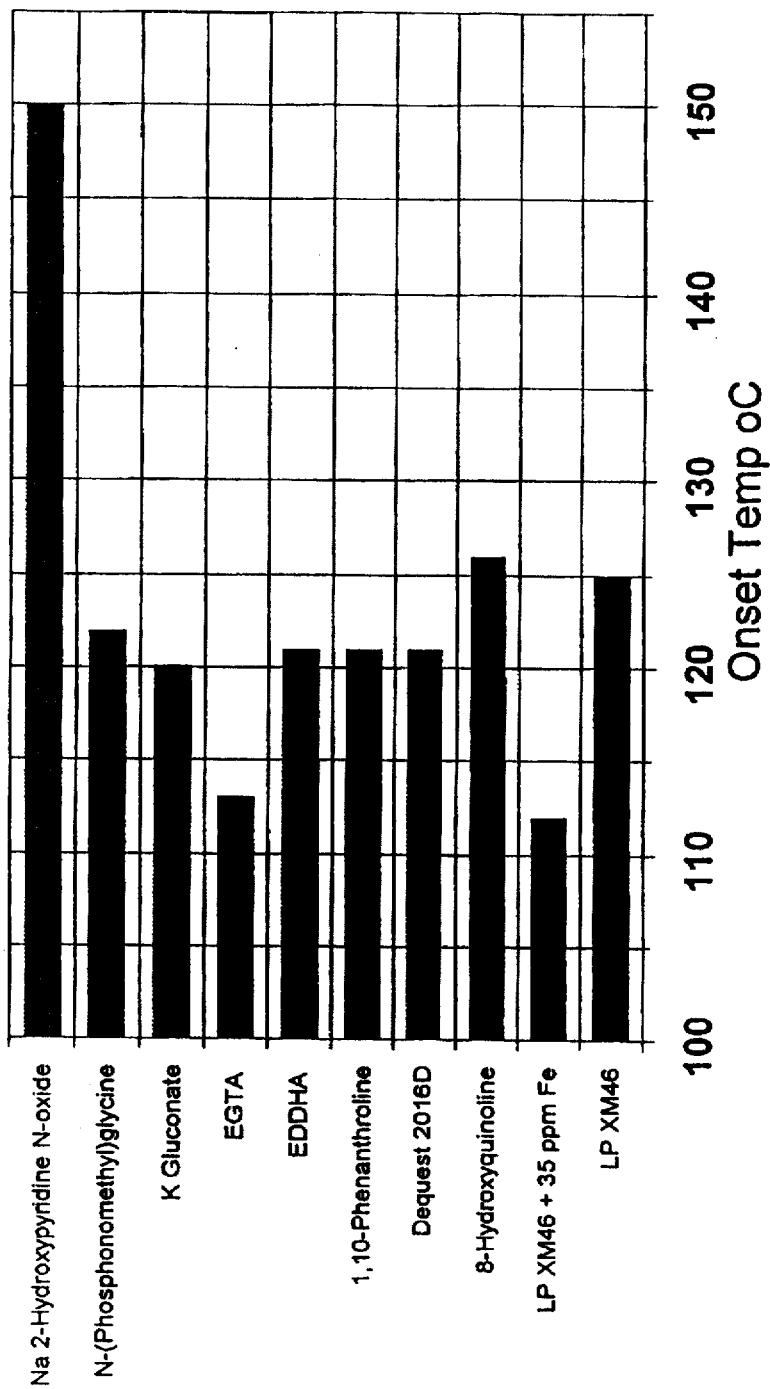
FIG. 1 shows evaluation of stabilizers by ARC.
Figure 2:
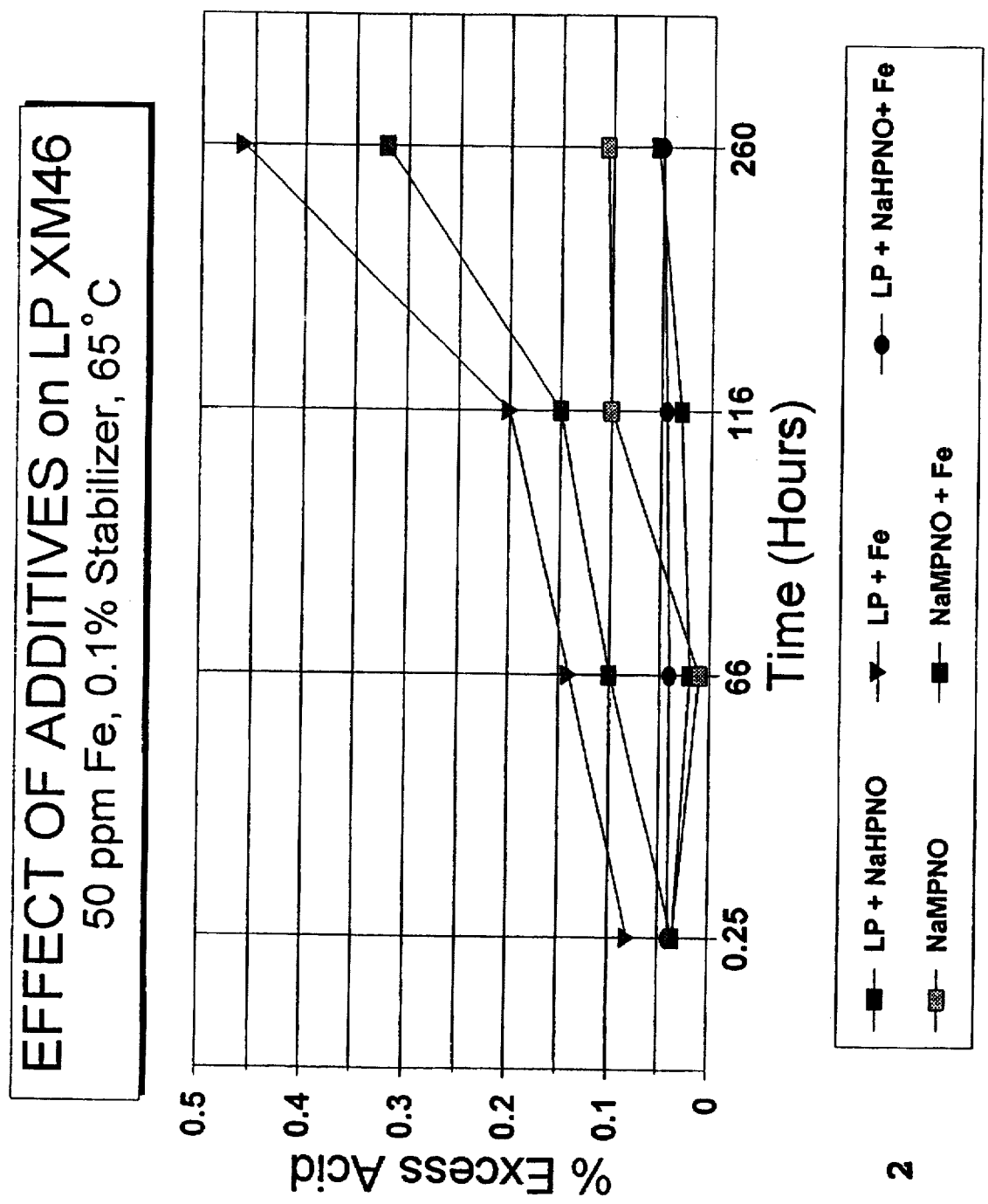
FIG. 2 shows effect of substituted Pyridine-N-oxides on acid generation rates in LP XM46.

It has now been surprisingly found, in accordance with the present invention, that the stability against chemical degradation of HAN- and hydroxylamine-containing compositions is considerably enhanced by the incorporation into the composition of a select pyridine or pyridone stabilizer. The preferred stabilizer is the sodium salt of 2-hydroxypyridine-N-oxide, a commercially-available compound. Without wishing to be bound by any particular theory, it is believed that the sodium ion in the stabilizer transchealates with soluble iron present in, or entering the HAN- or hydroxylamine-containing composition or propellant formulation from an outside source, to form a stable iron complex with the pyridine-N-oxide. As additional soluble iron enters the composition, for example from a storage container, during storage and prior to use of the composition, additional formation of iron complex of the pyridine-N-oxide occurs.

Hydroxylammonium nitrate (HAN) is an oxidizer for propellants that has recently become available in commercial quantities. It has many desirable properties such as: high oxygen content, very high water solubility and contains no halogen atoms. It is used as an oxidizer in several propellant applications, such as LP XM46, a new liquid gun propellant being developed by the Army. The formulated LP XM46 propellant composition contains 60.2% hydroxylammonium nitrate, 19.8% triethanolammonium nitrate and 20.0% water.

Unfortunately, storage stability is an issue for these HAN-containing compositions, as mentioned hereinabove. More specifically, hydroxylamine cation is present in a HAN-containing composition, and this cation is susceptible to iron catalyzed decomposition. This decomposition causes the production of nitrogen oxides and nitric acid, causing increased instability of the material.

Ideally, all propellants, including those containing HAN and/or hydroxylamine, should have shelf lives of approximately 20 years. The present inventors believe that the stabilized HAN and hydroxylamine-containing compositions will enable propellant formulators to meet that ideal goal. In fact, the present inventors have found that iron contaminated LP XM46 when treated with the 2-hydroxypyride-N-oxide sodium salt (also referred to herein as "NaHPNO"), exhibited a decomposition onset temperature greater than that of pure LP XM46 as measured by Accelerated Rate Calorimetry (ARC).

Other advantageous stabilizers useful in the present invention include: 2-hydroxy-4-methoxy-pyridine-N-oxide, 1,2-dimethyl-3-hydroxy-pyridine-4-one, 4-methyl-pyridine-N-oxide, 6-methyl-pyridine-N-oxide, 1-methyl-3-hydroxy-pyridine-2-one, and combinations thereof. The stabilizers are suitably employed in accordance with the present invention in acid form, or in their salt form, such as an alkali metal or alkaline earth metal salt, as well as salts made using Group 1A metals, the Group 2A metals and the transition metals, especially iron, nickel, chromium, copper and zinc. Other useful salt forms of these various stabilizers include the amine salts, lower alkylamine salts and alkanolamine salts.

Also illustrative of the stabilizers useful in the present invention are zinc pyrithione, copper pyrithione, manganese pyrithione, nickel pyrithione, cobalt pyrithione, bismuth pyrithione, zirconium pyrithione, 1-hydroxy-6-substituted pyridiones having a 6-ring substituent selected from —O—R and —S—R, wherein O is oxygen, S is sulfur, and R is a substituted or unsubstituted hydrocarbon radical having between 1 and 20 carbon atoms, and combinations thereof.

Representative structural formulas for various pyridine and pyridone stabilizers include Formulas I, II and III as follows:

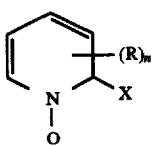

(Formula I)

wherein X is a moiety selected from SH, OH and NH$_2$, n is an integer of 1 or 2, and R is hydrogen or a lower alkyl or lower alkoxy group having from one to six carbons;

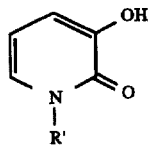

(Formula II)

wherein R' is a moiety selected from the group consisting of hydrogen and a lower alkyl group having from one to six carbons; and,

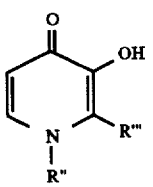

(Formula III)

wherein R" is a moiety selected from the group consisting of hydrogen and a lower alkyl group having from one to six carbons, and R'" is a lower alkyl or lower alkoxy group having from one to six carbons.

The stabilizer is suitably employed at a use level of 0.0001% to 2% by weight of the solution to be stabilized. The preferred use level is 10–1000 parts per million (milligrams per kilogram) of the HAN or hydroxylamine-containing composition to be stabilized.

In accordance with the present invention, the stabilizers are suitably employed in hydroxylamine-containing compositions, as well as in solutions of hydroxylammonium nitrate, formulations of hydroxylammonium nitrate with various fuel components, such as the triethanolammonium nitrate found in the above-discussed LP XM46 propellant composition. Chemical process for preparing HAN are disclosed in U.S. Pat. No. 5,510,097 and electrochemical processes for preparing HAN are disclosed in U.S. Pat. No. 5,258,104.

The following examples are intended to illustrate, but in no way limit the scope of, the present invention. All patents cited in this application are incorporated by reference herein in their entirety. All percentages referred to herein are by weight, unless otherwise specified.

EXAMPLE 1

Part A—Sample Preparation

A stock solution of iron-containing LP XM46 was prepared by weighing out 18.4 mg of ferric nitrate nonahydrate [Fe(NO$_3$)$_3$ 9H$_2$O]. This was placed in a 50 mL volumetric flask which was then filled to the line with liquid propellant XM46 (sp.gr.=1.45). The evaluation samples were prepared by weighing out 14.5 mg of each candidate. They were placed in a one ounce Teflon bottle and 10 mL of the iron-containing propellant pipetted in. This corresponds to 0.1% concentration of the stabilizer candidate. The samples were well shaken and submitted for evaluation by Accelerated Rate Calorimetry.

Part B—Accelerated Rate Calorimetry

In an ARC evaluation, the sample is placed in a sealed tantalum container in the adiabatic chamber of the instrument. It is heated to a pre-determined temperature and held, looking for any temperature exotherm in the sample. If there is none, heating to the next temperature is carried out. This is repeated until an exothermic reaction is detected. This method is very precise, with a detection level of 0.02 degrees per minute. The results obtained are presented in FIG. 1. Data is shown for neat LP XM46, LP XM46 containing 35 ppm of iron and for the various candidates. The eight materials examined were at the 0.1% level with 35 ppm of iron as contaminant.

The high ARC onset temperatures observed suggest that more than simple chelation of the iron is occurring, since the temperature is higher than for neat, untouched LP XM46. LP XM46 with some iron in addition to the HPNO is better than neat propellant. This suggests that the iron complex of HPNO may be acting as a stabilizer in some additional, unanticipated fashion.

Therefore, ferric nitrate was reacted with three equivalents of the 2-hydroxypyride-N-oxide sodium salt to give a highly insoluble, red precipitate. It was collected by filtration, washed and dried. The elemental analysis confirmed it to be Fe(HPNO)$_3$.

Part C—Acid Generation Rate

The iron catalyzed decomposition of HAN-based propellants is accompanied by an increase in the nitric acid level. This further de-stabilizes the propellant. The increases in acid as a function of time and iron content can be determined titrimetrically using standard methods and can be used to indirectly follow the effect of iron on the system and of iron chelators that inhibit the decomposition.

Samples were prepared in the same manner as in Example 2, except that the iron concentration was adjusted to 50 ppm in order to accelerate the experiment. The additives used to chelate iron were the sodium salt of 2-hydroxypyridine-N-oxide (NaHPNO) and the sodium salt of 2-mercaptopyridine-N-oxide (NaMPNO). The samples were placed in an oven at 65° C. for a total of 260 hours. The results of the acid build-up are presented in the graph and table below.

TABLE 1

Effect of Pyridine-N-oxides on Acid Generation Rates in LP XM46

| Hours | LP + NaHPNO | LP + Fe | LP + NaHPNO + Fe | NaMPNO | NaMPNO + Fe |
|---|---|---|---|---|---|
| 0.25 | 0.035 | 0.08 | 0.04 | 0.035 | 0.035 |
| 66 | 0.02 | 0.14 | 0.04 | 0.01 | 0.1 |
| 116 | 0.03 | 0.2 | 0.045 | 0.1 | 0.15 |
| 260 | 0.055 | 0.46 | 0.05 | 0.105 | 0.32 |

NaMPNO=Sodium salt of 2-mercapto-pyridine-N-oxide
NaHPNO=Sodium salt of 2-hydroxy-pyridine-N-oxide LP
XM46=Liquid propellant LP XM46

Part D—Stabilization of HAN Solutions

In addition to the formulated propellants, the stabilizers were evaluated in 82% HAN solutions. This is the concentration of the oxidizer commonly produced for use in the LP XM46.

Sodium mercaptopyridine-N-oxide (27 mg of 40% aqueous solution) was added to 10 grams of 82% HAN solution. The onset of decomposition as determined by ARC calorimetry was between 140° and 150° C. HAN without the addition of NaMPNO decomposed at 126° C. The increased decomposition temperature provided by the NaMPNO-containing HAN composition, as compared to the decomposition temperature for HAN without NaMPNO, demonstrates the enhanced stability of the NaMPNO-containing HAN.

While the invention has been described above with references to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A stabilized hydroxylammonium nitrate or hydroxylamine-containing composition comprising said hydroxylammonium nitrate or hydroxylamine and a pyridine or pyridone salt, or an acid thereof, said pyridine or pyridone salt, or acid thereof, being present in said composition in an amount of between about 0.0001% and about 2%, based upon the weight of said composition, wherein said pyridine or pyridone salt is the sodium salt of 2-hydroxypyridine-N-oxide.

2. The composition of claim 1 which additionally contains a fuel.

3. The composition of claim 2 wherein said fuel is triethanolammonium nitrate.

4. The composition of claim 1 wherein said sodium salt of 2-hydroxypyridine-N-oxide is present in said composition in an amount of from about 10 to about 1000 parts per million.

5. A stabilized hydroxylammonium nitrate or hydroxylamine-containing composition comprising said hydroxylammonium nitrate or hydroxylamine and a pyridine or pyridone salt, or an acid thereof, said pyridine or pyridone salt, or acid thereof, being present in said composition in an amount of between about 0.0001% and about 2%, based upon the weight of said composition, wherein said pyridine or pyridone salt is represented by the structural formula:

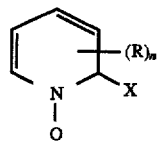

wherein X is a moiety selected from the group consisting of SH, OH and $NH_2$, n is an integer of 1 or 2, and R is hydrogen or a lower alkyl or lower alkoxy group having from one to six carbons.

6. A stabilized hydroxylammonium nitrate or hydroxylamine-containing composition comprising said hydroxylammonium nitrate or hydroxylamine and a pyridine or pyridone salt, or an acid thereof, said pyridine or pyridone salt, or acid thereof, being present in said composition in an amount of between about 0.0001% and about 2%, based upon the weight of said composition, wherein said pyridine or pyridone salt is represented by the structural formula:

wherein R' is a moiety selected from the group consisting of hydrogen and a lower alkyl group having from one to six carbons.

7. A stabilized hydroxylammonium nitrate or hydroxylamine-containing composition comprising said hydroxylammonium nitrate or hydroxylamine and a pyridine or pyridone salt, or an acid thereof, said pyridine or pyridone salt, or acid thereof, being present in said composition in an amount of between about 0.0001% and about 2%, based upon the weight of said composition, wherein said pyridine or pyridone salt is represented by the structural formula:

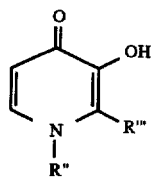

wherein R" is a moiety selected from the group consisting of hydrogen and a lower alkyl group having from one to six carbons, and R'" is a lower alkyl or lower alkoxy group having from one to six carbons.

8. A stabilized hydroxylammonium nitrate or hydroxylamine-containing composition comprising said hydroxylammonium nitrate or hydroxylamine and a pyridine or pyridone salt, or an acid thereof, said pyridine or pyridone salt, or acid thereof, being present in said composition in an amount of between about 0.0001% and about 2%, based upon the weight of said composition, wherein said pyridine or pyridone salt is selected from the group consisting of: zinc pyrithione, copper pyrithione, manganese pyrithione, nickel pyrithione, cobalt pyrithione, bismuth pyrithione, zirconium pyrithione, 1-hydroxy-6-substituted pyridiones having a 6-ring substituent selected from the group consisting of —O—R and —S—R, wherein O is oxygen, S is sulfur, and R is a substituted or unsubstituted hydrocarbon radical having between 1 and 20 carbon atoms, and combinations thereof.

9. A process for stabilizing hydroxylammonium nitrate or hydroxylamine against unwanted degradation during storage prior to use which comprises contacting said hydroxylammonium nitrate or hydroxylamine with a stabilizing-effective amount of a pyridine or pyridone salt to provide a storage stable composition, wherein said pyridine or pyridone salt is the sodium salt of 2-hydroxypyridine-N-oxide.

10. The process of claim 9 wherein said sodium salt of 2-hydroxypyridine-N-oxide is present in said composition in an amount of from about 10 to about 1000 parts per million.

* * * * *